(12) United States Patent
Moriyoshi

(10) Patent No.: US 8,964,841 B2
(45) Date of Patent: Feb. 24, 2015

(54) MOVING IMAGE STREAM PROCESSING APPARATUS, MOVING IMAGE REPRODUCTION APPARATUS EQUIPPED WITH THE SAME, METHOD, AND PROGRAM

(75) Inventor: Tatsuji Moriyoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 806 days.

(21) Appl. No.: 12/528,040

(22) PCT Filed: Feb. 20, 2008

(86) PCT No.: PCT/JP2008/052829
§ 371 (c)(1),
(2), (4) Date: Aug. 20, 2009

(87) PCT Pub. No.: WO2008/102794
PCT Pub. Date: Aug. 28, 2008

(65) Prior Publication Data
US 2010/0080294 A1    Apr. 1, 2010

(30) Foreign Application Priority Data

Feb. 21, 2007    (JP) .................................. 2007-041124

(51) Int. Cl.
*H04N 7/12*       (2006.01)
*H04N 5/783*      (2006.01)
(Continued)

(52) U.S. Cl.
CPC .............. *H04N 5/783* (2013.01); *G11B 27/005* (2013.01); *H04N 19/00715* (2013.01); *H04N 19/00127* (2013.01); *H04N 19/00533* (2013.01); *H04N 19/00048* (2013.01); *H04N 19/0003* (2013.01);

(Continued)

(58) Field of Classification Search
None
See application file for complete search history.

(56) References Cited

U.S. PATENT DOCUMENTS 5,440,345 A * 8/1995 Shimoda .................. 375/240.14
5,740,307 A * 4/1998 Lane ............................ 386/343
(Continued)

FOREIGN PATENT DOCUMENTS

JP    A-5-344494 A    12/1993
JP    A-6-507287      8/1994
(Continued)

OTHER PUBLICATIONS

International Search Report for PCT/JP2008/052829 mailed Apr. 15, 2008.

(Continued)

*Primary Examiner* — Hassan Phillips
*Assistant Examiner* — Mark A Mais
(74) *Attorney, Agent, or Firm* — Sughrue Mion, PLLC

(57) ABSTRACT

Disclosed is a moving image reproduction apparatus including a stream extraction unit that extracts a bit stream of a prescribed number of consecutive pictures including an intra-frame coded picture as an initial picture from a bit stream of a coded moving image, a stream analysis unit that analyzes the extracted bit stream and decides whether or not, if decoding of the extracted bit stream is performed, one screen of decoded image including the intra-frame coded picture can be obtained, and a stream generation unit that generates a bit stream which complements an image of a region in which a decoded image cannot be obtained in one screen, based on a result of the analysis made by the stream analysis unit, when it is decided in the stream analysis unit that one screen of decoded image cannot be obtained.

15 Claims, 18 Drawing Sheets

(51) Int. Cl.

| | | |
|---|---|---|
| *G11B 27/00* | (2006.01) | |
| *H04N 19/51* | (2014.01) | |
| *H04N 19/132* | (2014.01) | |
| *H04N 19/44* | (2014.01) | |
| *H04N 19/112* | (2014.01) | |
| *H04N 19/107* | (2014.01) | |
| *H04N 19/172* | (2014.01) | |
| *H04N 19/577* | (2014.01) | |
| *H04N 19/587* | (2014.01) | |

(52) U.S. Cl.
CPC ... *H04N 19/00266* (2013.01); *H04N 19/00721* (2013.01); *H04N 19/00751* (2013.01)
USPC ............ 375/240.13; 375/240.12; 375/240.15

(56) References Cited

U.S. PATENT DOCUMENTS

| | | | |
|---|---|---|---|
| 6,259,734 B1 * | 7/2001 | Boon | 375/240 |
| 8,244,897 B2 * | 8/2012 | Niwa et al. | 709/231 |
| 2003/0123849 A1 * | 7/2003 | Nallur et al. | 386/68 |
| 2003/0194209 A1 * | 10/2003 | Kim et al. | 386/68 |
| 2003/0231863 A1 | 12/2003 | Eerenberg et al. | |
| 2005/0002646 A1 | 1/2005 | Sato | |
| 2005/0099869 A1 | 5/2005 | Crinon et al. | |
| 2006/0146931 A1 * | 7/2006 | Boyce | 375/240.08 |

FOREIGN PATENT DOCUMENTS

| | | |
|---|---|---|
| JP | A-9-172605 | 6/1997 |
| JP | A-11-041591 | 2/1999 |
| JP | P2003-219362 A | 7/2003 |
| JP | P2004-015700 A | 1/2004 |
| JP | P2004-040516 A | 2/2004 |
| JP | P2004-328634 A | 11/2004 |
| JP | P2005-527131 A | 9/2005 |
| JP | 2006277927 A | 10/2006 |
| WO | 02087232 A1 | 10/2002 |
| WO | 03036809 A1 | 5/2003 |

OTHER PUBLICATIONS

ITU-T Recommendation H264, "Advanced Video Coding for Generic Audiovisual Services", Mar. 2005.
Supplementary European Search Report for EP 08 71 1635 completed May 5, 2010.
European Communication for EP 08 71 1635 issued Apr. 8, 2011.
Japanese Office Action for JP2009-500205 mailed on Jul. 24, 2012.

* cited by examiner

FIG. 11

| No. | BIT STREAM | SPECIAL-REPRODUCTION BIT STRAEM |
|---|---|---|
| 1 | File01.stream | File01_FFW.stream |
| 2 | File02.stream | File02_FFW.stream |
| 3 | File03.stream | File03_FFW.stream |
| ⋮ | ⋮ | ⋮ |

FIG. 12

| No. | BIT STREAM | HIGH-SPEED REPRODUCTION BIT STREAM | | HIGH-SPEED REVERSE REPRODUCTION BIT STREAM | |
|---|---|---|---|---|---|
| | | File01_FFW.stream | | File01_FRW.stream | |
| | | PICTURE NO | TIME STAMP (SEC) | | TIME STAMP (SEC) |
| 1 | File01.stream | 1 | 0.0 | | 119.0 |
| | | 2 | 1.0 | | 118.0 |
| | | 3 | 2.0 | | 117.0 |
| | | 4 | 3.0 | | 116.0 |
| | | 5 | 4.0 | | 115.0 |
| | | 6 | 5.0 | | 114.0 |
| | | ... | ... | | ... |
| | | File02_FFW.stream | | | |
| 2 | File02.stream | ... | | | ... |
| ... | | | | | |

FRAME CODING

FIELD CODING

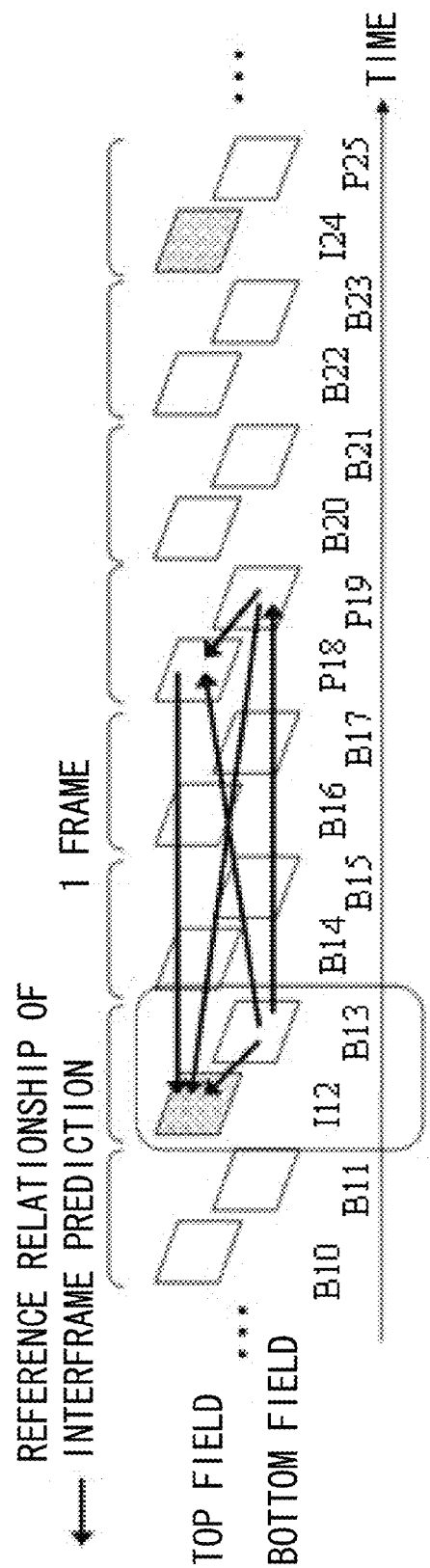

MOVING IMAGE STREAM PROCESSING APPARATUS, MOVING IMAGE REPRODUCTION APPARATUS EQUIPPED WITH THE SAME, METHOD, AND PROGRAM

This application is the National Phase of PCT/JP2008/052829, filed on Feb. 20, 2008, which is based upon and claims priority of Japanese patent application No. 2007-041124, filed on Feb. 21, 2007, the disclosure of which is incorporated in its entirety herein by reference.

TECHNICAL FIELD

The present invention relates to a moving image reproduction method and apparatus. In particular, it relates to a preferred moving image reproduction method and apparatus applicable to special reproduction such as high-speed reproduction and high-speed reverse reproduction.

BACKGROUND ART

As techniques for coding a moving image signal with a low bit rate, a high compression rate, and high quality to generate coded data and for decoding a coded moving image, H.261 and H.263 standardized by the ITU (International Telecommunication Union), MPEG-1, MPEG-2, and MPEG-4 specified by the ISO (International Organization for Standardization), and so forth are widely used as international standards.

It is known that H.264 (see Non-Patent Document 1) standardized jointly by the ITU and the ISO achieves better compression efficiency and image quality, compared with conventional moving image coding techniques.

In these moving image coding techniques, inter-frame predictive coding, which utilizes temporal correlation between individual frames, is widely used in order to efficiently compress a moving image signal.

In inter-frame predictive coding, an image signal of a previously coded frame is used to predict an image signal of a current frame, and a prediction error signal between the predicted signal and the current signal is coded.

In ordinary moving images, since there is a strong correlation between image signals of temporally close frames, this technique is effective in improving compression efficiency.

Moving image coding techniques such as MPEG (Moving Picture Expert Group)-1, MPEG-2, MPEG-4, and H.264 use a combination of the following pictures to code moving images:

an I picture, which does not use inter-frame predictive coding (Intra picture: Intra-frame coded image);

a P picture, which uses inter-frame predictive coding based on a previously coded frame (Predictive picture: Unidirectionally prodictive coded image); and a B-picture, which uses inter-frame predictive coding, based on two previously coded frames (Bidirectionally predicative coded picture).

In decoding, an I picture can be decoded by using a single frame thereof. However, since a P picture and a B picture need image data for inter-frame prediction in advance, they cannot be decoded with a single frame alone.

FIG. 13 schematically shows an example of the structure of pictures used in moving image coding. Each of the rectangles represents one frame, and the picture type and display order of each frame are shown below (for example, B5 is the fifth frame in the display order and is coded as a B picture). Thus, a moving image has conventionally been coded by suitably combining these I, P, and B pictures having different characteristics with each other.

As shown in FIG. 13, conventionally, when special reproduction such as high-speed reproduction or high-speed reverse reproduction (also referred to as reverse high-speed reproduction) is conducted on a bit stream of a coded moving image, an I-picture bit stream alone, which can be decoded by itself, is extracted from the bit stream, so as to reproduce the moving image.

As a related technique, FIGS. 14A to 14C schematically show an example of the operation of a method for obtaining a high-speed reproduction bit stream and a high-speed reverse reproduction bit stream. FIG. 15 shows a typical example of the structure of a apparatus realizing the method of FIGS. 14A to 14C.

In FIG. 15, a bit stream is supplied to a stream extraction unit 101. The stream extraction unit 101 extracts an I-picture bit stream alone from the supplied bit stream supplied and supplies the extracted stream to a stream arrangement unit 102.

The stream arrangement unit 102 arranges the supplied I-picture bit stream as needed, and outputs the stream to the outside.

For high-speed reproduction, the stream extraction unit 101 sequentially extracts an I-picture bit stream alone from the bit stream of FIG. 14A. The extracted I pictures are sequentially set to form a bit stream, whereby a high-speed reproduction bit stream is obtained (I0, I6, I12, I18 . . . in FIG. 14B, for example). For high-speed reproduction, no arrangement processing is carried out by the stream arrangement unit 102.

For high-speed reverse reproduction, similarly, the stream extraction unit 101 extracts I pictures alone from the bit stream, and the stream arrangement unit 102 arranges the extracted I pictures in the reverse display order and then outputs the pictures. In this way, a high-speed reverse reproduction bit stream is obtained ( . . . I18, I12, I6, I0 of FIG. 14C, for example). For example, by developing the above method, Patent Document 1 discloses a technique in which minimum I pictures alone necessary for display are extracted to generate a high-speed reproduction stream. Namely, according to the disclosure of Patent Document 1, for fast-forward reproduction, display frames are specified at certain intervals, and if a specified frame is an independent frame (I picture), the frame is used for display. However, if a specified frame is a dependent frame (a P picture or a B-picture), an independent frame (I picture) that is the most temporally adjacent to the frame is used for display.

The above method is also applicable to special reproduction of a bit stream coded with the moving image coding technique of H.264 standardized recently. However, as compared with conventional coding standards such as MPEG-1, MPEG-2, and MPEG-4, H.264 allows many coding variations, and thus, there are cases in which conventional methods cannot be applied. Such cases will be hereinafter described.

In H.264, frame coding suitable for a progressive image (image in progressive scan format) and field coding suitable for interlaced image (image in interlace scan format) can be appropriately selected and used.

As shown in FIG. 16A, in frame coding, the entire image is coded as a single picture (frame picture). In contrast, as shown in FIG. 16B, in field coding, an image is divided into odd and even lines, which are then coded as separate pictures (field pictures).

Further, in H.264, in the case of field coding, each of the two field pictures forming an image can be coded by different kinds of coding (I picture, P picture, or B picture).

FIG. 17 shows an example of a bit stream coded by field coding. In FIG. 17, each of the rectangles represents a single field picture, and two field pictures form a single frame. Also, an arrow indicates a reference relationship of inter-frame prediction, and this example shows that a field picture P13 uses an I12 for me prediction. In FIG. 17, reference relationships of interframe prediction between pictures other than the P13 are not shown.

In the example of FIG. 17, the I12 and the P13 form a single frame, and while the I12 is an I picture, the P13 is a P picture.

The structure shown in FIG. 15 cannot generate a high-speed reproduction bit stream and a high-speed reverse reproduction bit stream from the bit stream of FIG. 17.

That is, based on the structure shown in FIG. 15, while the stream extraction unit 101 extracts an I-picture bit stream alone from an input bit stream received, a stream of the I12 and the I24 alone from the bit stream shown in FIG. 17. Each of the pictures only includes image information for a single field. Thus, even when the extracted stream is decoded, decoding results forming one screen cannot be obtained.

Thus, if a high-speed reproduction bit stream is generated based on the structure shown in FIG. 15, decoding the high-speed reproduction bit stream may cause problems; for example, only one side of fields (odd lines or even lines) in an image is updated, or an image having a mixture of a past field and a current field is output.

However, by developing the above method described with reference to FIG. 15 and the like, it is easily conceivable that the above problems could be solved by extracting not merely an I picture (field picture) but two field pictures including the I picture in case of field coding.

In this case, the stream extraction unit 101 of FIG. 15 extracts not only the I12 and the I24 but also the I12 and the P13 as well as the I24 and the P25 shown in FIG. 17 (approach 2).

With the use of this approach 2, the above problems can be solved in the case of the example shown in FIG. 17. That is, if the stream extraction unit 101 extracts the I12 and the P13 and decodes these two pictures, decoding results forming one screen can be obtained. Thus, a high-speed reproduction bit stream and a high-speed reverse reproduction bit stream can be created.

However, this is effective because the P13 uses only the I12 for inter-frame prediction in the example of FIG. 17. The approach 2 does not fundamentally solve the above problems, and the reason will be hereinafter described.

In H.264, there are many variations in inter-frame prediction. For example, such inter-frame prediction as shown in FIG. 18 is possible. That is, a field picture B13 uses not only an I12 but also a P18 and a P19 for inter-frame prediction.

In such case, even when the stream extraction unit 101 extracts the I12 and the B13 in accordance with the method 2, since the B13 cannot obtain image data necessary for inter-frame prediction (the P18 and the P19 in the example of FIG. 18), the B13 cannot be decoded. Thus, decoding result forming one screen cannot be obtained.

As a moving image decoding apparatus (method) to solve the above problems, for example, Patent Document 2 discloses image decoding apparatus (method) comprising a control means for controlling a decoding means. In a high-speed reproduction mode, the decoding means conducts decoding processing only on intra-coded image data coded by frame coding or on coded image data of one of a pair of fields in the intra-coded image, and intra-field coded image data coded by field coding. According to the invention disclosed in Patent Document 2, in a high-speed reproduction mode, a frame-coded I picture, one of the pair of fields in a frame-coded I picture, or a field-coded I picture alone are decoded, and an obtained one-filed decoded image is copied onto the other field to form one screen.

Relating to the above background art, Patent Document 3 discloses recording and reproducing apparatus, aiming to reduce the amount of information by extracting an I picture from an MPEG stream, re-encoding the I picture to generate an intermittent stream, recording the intermittent stream on a recording medium, reading the stream on the recording medium to decode the stream, and conducting re-encoding with the use of the I pictures alone. Patent Document 4 discloses a structure for obtaining a frame image by synthesizing an image of odd fields and an image of even fields of an interlace image data (a structure for directly processing an image). Further, Patent Document 5 discloses a structure in which a copy of one of a pair of fields forming one frame of a video signal (top field data, for example) is made as the other field data (bottom field image data) to generate a frame image, and the frame image is compressed and coded. Patent Document 6 discloses a structure in which a header analysis means analyzes coding mode information and outputs coding mode analysis information. The header analysis means identifies whether or not an inputted video stream is a bit stream obtained by coding a progressive scanning image with frame coding or is an image obtained by coding an interlace scanning image with frame or field coding, and the header analysis means then outputs the results as coding mode analysis information to a decoding control means. When the decoding control means decodes a first bit stream, obtained by coding an interlace scanning image with frame or field coding, based on the coding mode analysis information, the means alternately outputs a first timing signal indicating the start of decoding the top field and a second timing signal indicating the start of decoding the bottom field. When the decoding control means decode a second bit stream obtained by coding a progressive scanning image with frame coding, the means outputs a third timing signal indicating the start of decoding in the middle of a display start signal. Each of the inventions disclosed in the above Patent Documents 1 to 6 is utterly different from the present invention to be described below in any of the aspects of its object, constitution, and operation and effect.

Patent Document 1:
  JP Patent Kokai Publication No. JP-A-05-344494
Patent Document 2:
  JP Patent Kokai Publication No. JP-P2004-328634A
Patent Document 3:
  JP Patent Kokai Publication No. JP-P2003-219362A
Patent Document 4:
  JP Patent Kokai Publication No. JP-P2004-015700A
Patent Document 5:
  JP Patent Kokai Publication No. JP-P2004-040516A
Patent Document 6:
  JP Patent Kokai Publication No. JP-A-11-041591
Non-Patent Document 1:
  ITU-T Recommendation H.264 "Advanced video coding for generic audiovisual services," March 2005

SUMMARY

Entire disclosure of each of the above Patent Documents 1 to 6 and Non-Patent Document 1 is incorporated by reference in the present application. The analysis of the related art is given by the present invention.

While a decoding apparatus using the invention described in Patent Document 2 can realize high-speed reproduction of a bit stream coded by field coding based on H.264, a new function is added to the decoding apparatus. However, if an identical bit stream is inputted to a decoding apparatus using the invention described in Patent Document 2 and a decoding apparatus that does not use the invention described in Patent Document 2, decoding results largely differ between the two apparatuses.

Regarding moving image coding techniques of international standards such as MPEG-1, MPEG-2, MPEG-4, and H.264, the operation of a decoding apparatus is strictly defined. It is ensured that an input of the same bit stream provides approximately or exactly the same decoding results, as long as the decoding apparatus complies with the standards, regardless of the manufacturer (vendor) of the decoding apparatus. This is one of the major advantages of the moving image coding techniques of international standards.

Thus, adding a function that does not comply with the standards to a decoding apparatus is not preferable depending on the purpose of use.

Further, in the invention of Patent Document 2, since a new function is added to a decoding apparatus, various problems may occur; for example, the structure of the decoding apparatus becomes complex, the difficulty of design and manufacture is increased, and cost is increased.

Generally, moving image decoding apparatuses are used more than moving image coding apparatuses. Thus, the complex structure of a decoding apparatus exerts a grievous effect.

The present invention has thus been made in view of the above problems, and a primary object of the present invention is to provide a moving image reproduction method, apparatus, and program that can realize special reproduction such as high-speed reproduction and high-speed reverse reproduction, without changing a decoding apparatus.

According to the present invention, there is provided a moving image stream processing apparatus comprising: a stream analysis unit for receiving and analyzing a bit stream of an intra-frame coded picture extracted from a bit stream of a coded moving image and determining whether or not, if decoding of the extracted intra-frame coded picture is performed, one screen of decoded image including the intra-frame coded picture can be obtained, based on a result of the analysis; and a stream generation unit for generating a bit stream providing a region in which a decoded image cannot be obtained in one screen with an image based on the result of the analysis made by the stream analysis unit when the stream analysis unit decides that one screen of decoded image cannot be provided. The moving image stream processing apparatus of the present invention may comprise a stream extraction unit for extracting a bit stream of an intra-frame coded picture from the bit stream of a coded moving image and supplying the extracted bit stream to the stream analysis unit.

In the moving image stream processing apparatus of the present invention, the stream extraction unit may extract a bit stream of a prescribed number of consecutive pictures including an intra-frame coded picture as the initial picture and the stream analysis unit may decide whether or not, if decoding of the extracted intra-frame coded picture is performed, one screen of decoded image including the intra-frame coded picture can be obtained.

In the moving image stream processing apparatus of the present invention, when the intra-frame coded picture is a field picture, the stream generation unit generates a bit stream which complements a field in which a decoded image cannot be obtained in one screen with an image similar to the intra frame coded field picture image.

In the moving image stream processing apparatus of the present invention, the stream generation unit may change a prescribed portion of the intra frame coded picture bit stream to generate an intra-frame coded picture, so that the region in which a decoded image cannot be obtained in the one screen is provided with an image similar to the intra-frame coded picture. Alternatively, the stream generation unit may refer to the intra-frame coded picture alone with inter-frame prediction to generate a unidirectionally predictive coded or bidirectionally predicative coded picture bit stream providing the region in which a decoded image cannot be obtained in the one screen with an image.

The moving image stream processing apparatus of the present invention, may further comprise a stream synthesis unit for synthesizing a bit stream providing one screen of decoded image from the extracted bit stream and the stream generated by the stream generation unit.

According to another aspect of the present invention, there is provided a moving image reproduction apparatus that comprises: a moving image decoding apparatus for decoding a bit stream of a coded moving image; the above moving image stream processing apparatus according to the present invention; a bit stream switching apparatus; and a moving image display apparatus. For normal reproduction, the bit stream switching apparatus supplies an inputted bit stream directly to the moving image decoding apparatus not via the moving image stream processing apparatus. In contrast, for special reproduction such as high-speed reproduction or high-speed reverse reproduction, the bit stream switching apparatus supplies an inputted bit stream to the moving image stream processing apparatus, and the moving image stream processing apparatus supplies a generated bit stream to the moving image decoding apparatus. The moving image decoding apparatus decodes the supplied bit stream and supplies the decoded image to the moving image display apparatus, and the moving image display apparatus displays and outputs the decoded image.

A recording medium (memory apparatus) according to another aspect of the present invention comprises: a bit stream of a coded moving image; a special-reproduction bit stream obtained by receiving the bit stream of a coded moving image to the moving image stream processing apparatus according to the present invention and generated as the output from the moving image stream processing apparatus; and a management table having associated information for conducting switching between the bit stream and the special-reproduction bit stream.

A moving image distribution apparatus according to still another aspect of the present invention comprises: the above recording medium according to the present invention; the bit stream switching apparatus; and a bit stream transmission apparatus. The bit stream switching apparatus reads the bit stream from the recording medium and supplies the bit stream to the bit stream transmission apparatus for normal reproduction. For special reproduction such as high-speed reproduction or high-speed reverse reproduction, the bit stream switching apparatus refers to the management table of the recording medium, reads the special-reproduction bit stream associated with the bit stream, and supplies the bit stream to the bit stream transmission apparatus. The bit stream transmission apparatus transmits the supplied bit stream to a transmission line for a certain receiving terminal.

A method according to the present invention, in one aspect thereof, comprises: a stream analysis step of receiving a bit stream of an intra-frame coded picture extracted from a bit stream of a coded moving image, analyzing the received bit stream, and determining whether or not, if decoding of the extracted intra-frame coded picture is performed, one screen of decoded image decoded image including the intra-frame coded picture can be obtained, based on a result of the analysis; and a stream generation step of generating a bit stream providing a region in which a decoded image cannot be obtained in one screen with an image based on the result of the analysis made by the stream analysis unit when the stream analysis unit decides that one screen of decoded image cannot be provided.

A computer program according to the present invention, in one aspect thereof, comprises a program causing a computer to execute: a stream analysis step of receiving a bit stream of an intra-frame coded picture extracted from a bit stream of a coded moving image, analyzing the received bit stream, and determining whether or not, if decoding of the extracted intra-frame coded picture is performed, one screen of decoded image decoded image including the intra-frame coded picture can be obtained, based on a result of the analysis; and a stream generation step of generating a bit stream providing a region in which a decoded image cannot be obtained in one screen with an image based on the result of the analysis made by the stream analysis unit when the stream analysis unit decides that one screen of decoded image cannot be provided.

In accordance with the present invention, special reproduction such as high-speed reproduction and high-speed reverse reproduction can be realized without any modification such as changing a decoding apparatus.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 11 shows an example of a management table of the fifth exemplary embodiment of the present invention.

FIG. 12 shows another example of the management table of the fifth exemplary embodiment of the present invention.

FIG. 18 shows another example of a bit stream coded by field coding.

PREFERRED MODES

Exemplary embodiments of the present invention will be described in detail with reference to drawings. A high-speed reproduction bit stream or a high-speed reverse reproduction bit stream generated by the method according to the related techniques and the like includes only information concerning a one-field image, and thus, even when such stream is decoded, decoding results forming one screen cannot be provided. In contrast, according to the present invention, a stream that complements an image of a region in which a decoded image cannot be obtained in one screen is additionally generated and synthesized to output a bit stream for special reproduction such as high-speed reproduction or high-speed reverse reproduction. By decoding the generated special-reproduction bit stream, decoding results forming one screen can be obtained. This special-reproduction bit stream can be entered to a normal decoding apparatus and the stream can be decoded by the decoding apparatus. So that, it is possible to realize special reproduction such as high-speed reproduction and high-speed reverse reproduction, by inputting a special-reproduction stream to a normal decoding apparatus that does not have any additional functions or the like to realize special reproduction and decoding the stream. Thus, according to the present invention, it is possible to realize special reproduction such as high-speed reproduction and high-speed reverse reproduction with an arbitrary decoding apparatus without any additional functions to realize high-speed reproduction or high-speed reverse reproduction, even when a bit stream coded with a picture structure or an inter-frame prediction relationship, with which the related techniques cannot generate a high-speed reproduction bit stream or a high-speed reverse reproduction bit stream, is received.

Exemplary Embodiment 1

Figure 1:
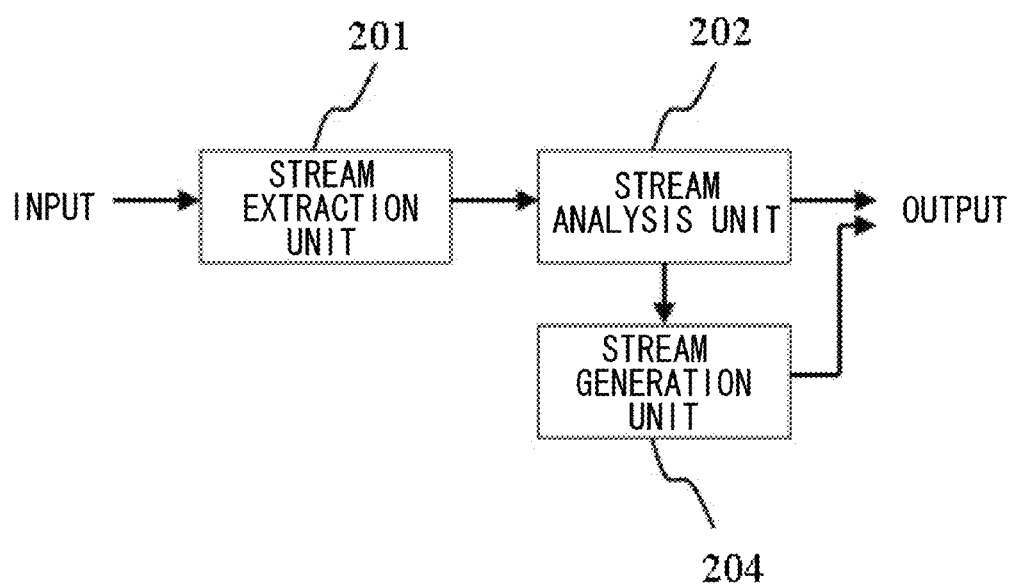
FIG. 1 shows a block diagram of a configuration of a first exemplary embodiment of the present invention.
Figure 2:
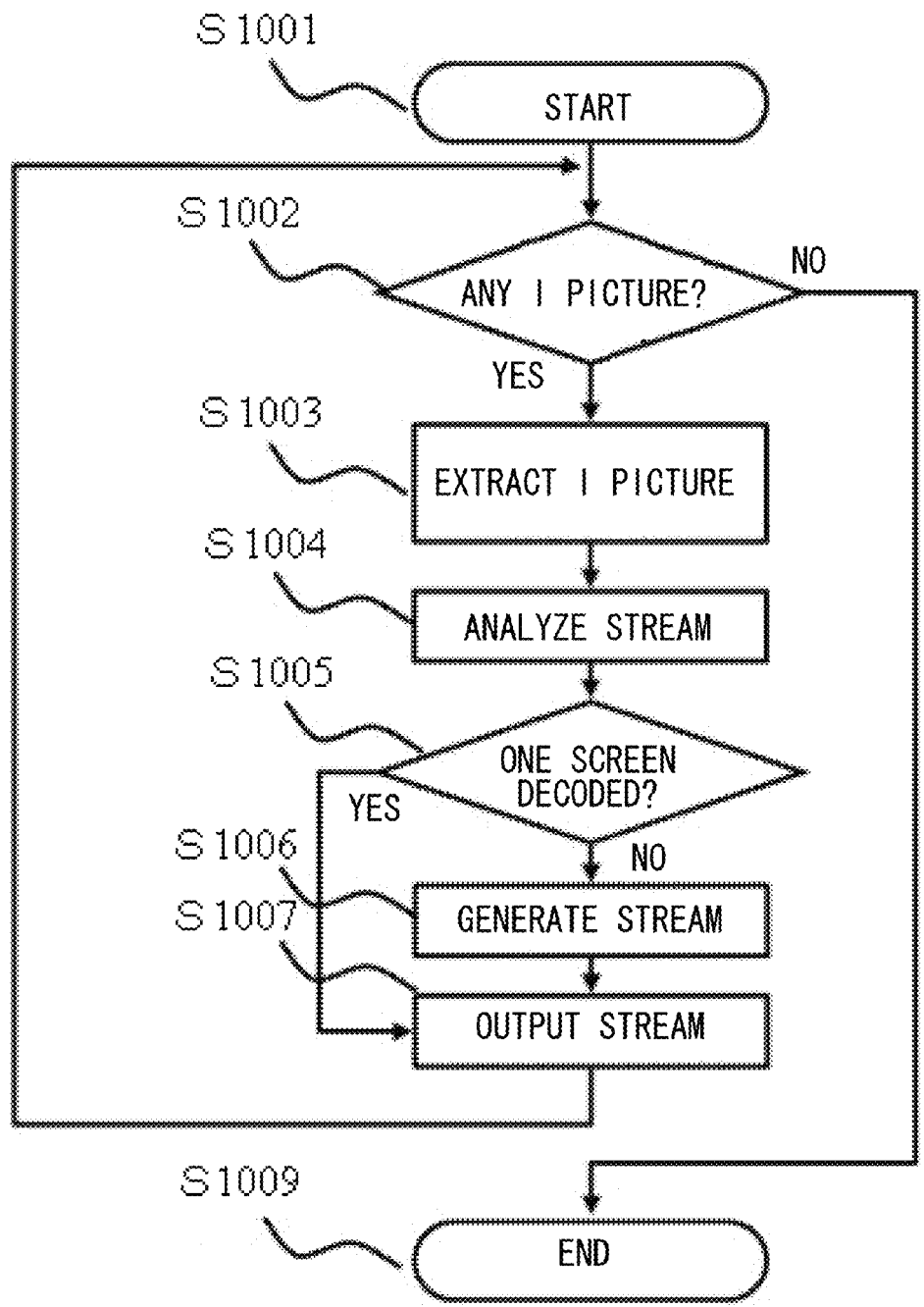
FIG. 2 shows a flow chart of a processing procedure of the first exemplary embodiment of the present invention.
Figure 3:
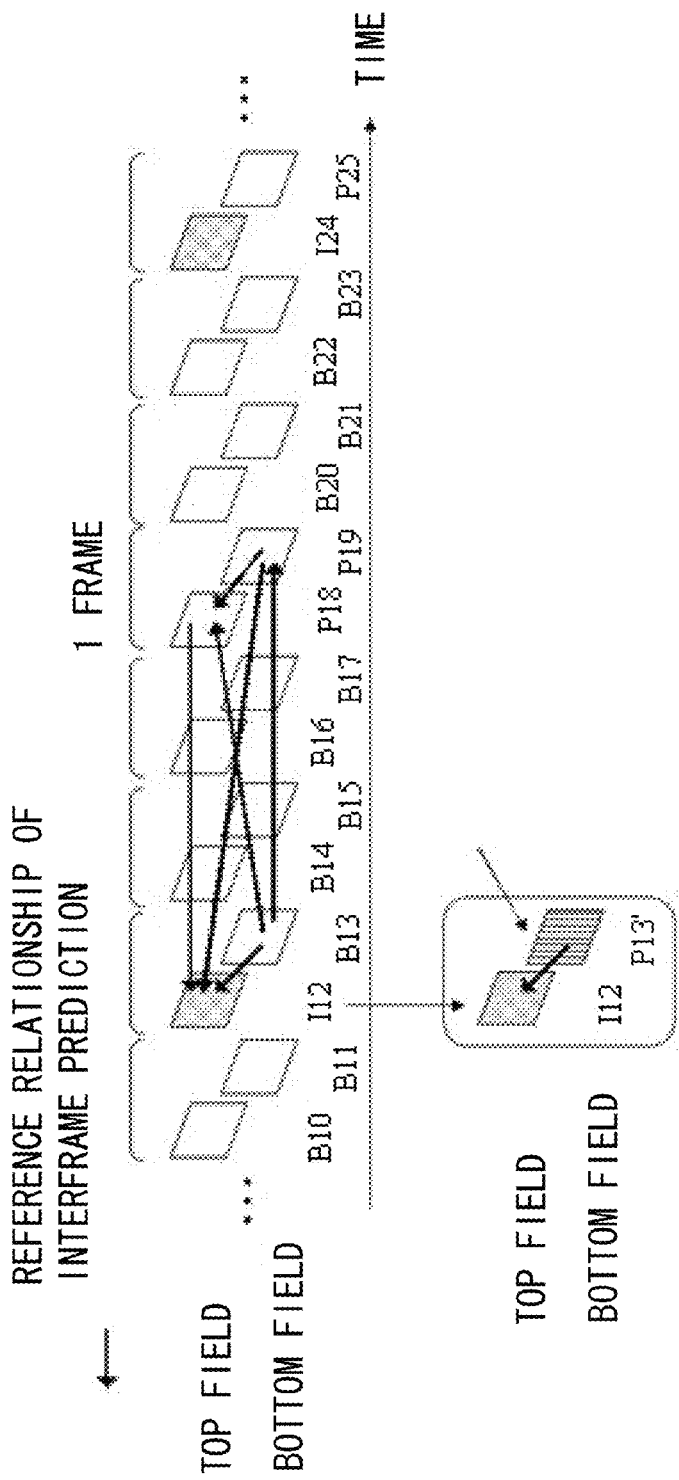
FIG. 3 shows an operation of the first exemplary embodiment of the present invention.
Figure 15:
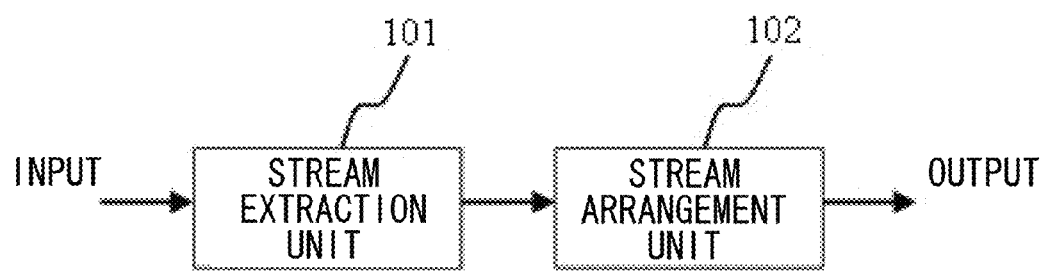
FIG. 15 shows a block diagram of a configuration of a related technique.
Figure 16A:
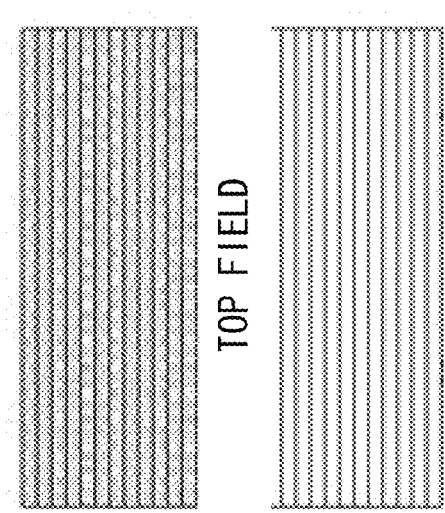
FIGS. 16A and 16B show an operation of frame coding and field coding.
Figure 16B:
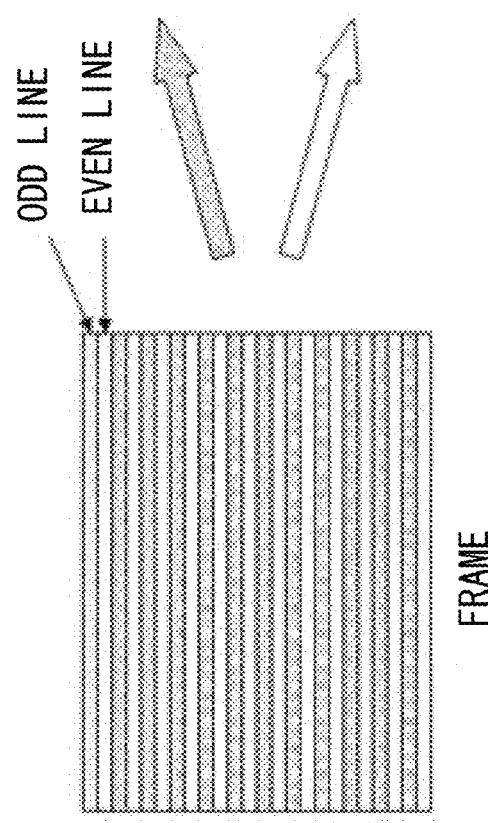
Figure 17:
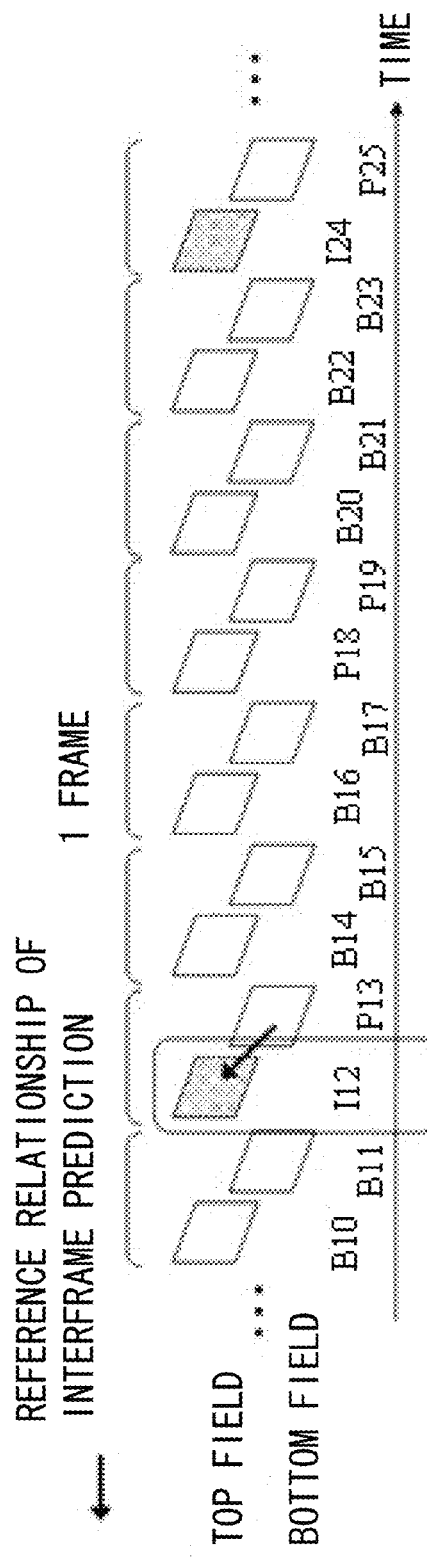
FIG. 17 shows an example of a bit stream coded by field coding.

FIG. 1 shows a structure of a first exemplary embodiment of the present invention. FIG. 2 shows a flow chart of a procedure of an operation of the first embodiment of the present invention. FIG. 3 schematically shows the first exemplary embodiment of the present invention. Referring to FIG. 1, the first exemplary embodiment of the present invention comprises: a stream extraction unit 201 that extracts a bit stream of an intra-frame coded picture from a bit stream of a coded moving image; a stream analysis unit 202 that analyzes the extracted bit stream of an intra-frame coded picture and that decides whether or not, if decoding of the extracted intra-frame coded picture is performed, one screen of decoded image decoded image including the intra-frame coded picture can be obtained, based on a result of the analysis; and a stream generation unit 204 that generates a bit stream which complements an image of a region in which a decoded image cannot be obtained in the one screen, based on the result of the analysis made by the stream analysis unit 202, when it is decided in the stream analysis unit 202 that one screen of decoded image cannot be obtained. The stream extraction unit 201 of FIG. 1 has substantially the same structure as the stream extraction unit 101 of FIG. 15. The stream extraction unit 201, the stream analysis unit 202, and the stream generation unit 204 are included in a moving image stream processing apparatus.

An operation of the first exemplary embodiment of the present invention will now be described. When processing is initiated (step S1001), the stream extraction unit 201 reads a bit stream received and decides whether the bit stream includes an I picture (step S1002). In the decision processing of step S1002, in the case of H.264 (Yes in step S1002), the coding type can be determined by the slice_type in a slice_header( ), for example.

As a result of the determination in step S1002, if no I picture is present (No in step S1002), the process goes to step S1009.

As a result of the determination in step S1002, if an I picture is present (Yes in step S1002), the stream extraction unit 201 extracts the I-picture stream and supplies the stream to the stream analysis unit 202 (step S1003).

The stream analysis unit 202 analyzes the I-picture stream and obtains information necessary for subsequent processing (step S1004). Examples of the information obtained by the stream analysis unit 202 include whether the picture is coded by frame coding or field coding. In the case of field coding, information concerning whether the picture is a top field or an IDR (Instantaneous Decoding Refresh) picture is used, for example.

Next, based on the obtained analysis information, the stream analysis unit 202 decides whether or not, by decoding the I picture, one screen of decoded image can be obtained (step S1005). In the case of H.264, if the I picture is coded by field coding, only one of a pair of fields forming one screen can be obtained. Thus, the decision in step S1005 is "No."

If "No" is decided in step S1005, the stream analysis unit 202 supplies necessary information (bit stream analysis result information) to the stream generation unit 204, and the stream generation unit 204 generates a bit stream which complements an image of the region in which a decoded image cannot be obtained (step S1006).

If "Yes" is decided in step S1005, the process goes to step S1007.

In step S1007, the I-picture stream extracted by the stream extraction unit 201 and the bit stream generated by the stream generation unit 204 (if any) are output. Next, the process returns to step S1002, and an input bit stream is searched for the next I picture.

The process ends in step S1009.

Regarding the bit stream generated by the stream generation unit 204, it is preferable to obtain a natural image as a result of decoding. That is, a decoded image identical or approximately identical to the decoded image of an I picture is preferable. Therefore, the bit stream may be generated by duplicating an I-picture bit stream and making necessary change to comply with moving image coding standards.

In the case of H.264, for example, when an I-picture is an IDR picture, it is necessary that a generated picture should not be an IDR picture. Thus, the following change need to be made, for example:

> nal_unit_type (identifier that identifies a type of a NAL (Network Abstraction Layer) unit) is changed; and
> idr_pic_id in the slice_header( ) is deleted.

Further, depending on the I-picture coding parameter, the following parameters in the slice_header( ) are changed, for example:

> frame_num;
> bottom_field_flag; and
> pic_order_cnt_lsb.

An I picture may be referred to in inter-frame prediction and motion compensation may be conducted with a motion vector having a length of zero so that a P-picture or B-picture bit stream having a zero residual signal is generated.

In order to obtain a decoded image interpolating an image spatially from an I-picture decoded image, an I picture may be referred to in inter-frame prediction and motion compensation may be conducted with a motion vector having a vertical length of 0.5 pixel so that a P-picture or B-picture bit stream having a zero residual signal is generated.

In the case of H.264, regarding a bit stream having a zero residual signal obtained by conducting motion compensation on all the macroblocks in a picture with a motion vector having a zero length or a motion vector having a vertical length of 0.5 pixel, it can be easily generated by coding motion vector information only on a prescribed number of macroblocks of an initial picture and by coding the rest as skip macroblocks.

An example of the operation for extracting an I picture I12 bit stream will be described with FIG. 3 in the case of H.264.

For ease of explanation, it is assumed that the I12 is an IDR picture (namely, nal_unit_type=5) and is a top field picture (namely, field_pic_flag=1 and bottom_field_flag=0).

Since the I12 is a field picture, when the stream analysis unit 202 analyzes this stream, it is decided that decoding the I12 alone cannot provide a decoded image of one-screen.

Thus, the stream generation unit 204 generates a bit stream which complements an image of a region in which a decoded image cannot be obtained.

Since the I12 is a top field picture, it is necessary to generate a bottom-field picture bit stream.

As an example of a stream to be generated, cases where an I picture (hereinafter referred to as I13') providing the same decoding results as the I-picture I12 is generated are described.

In this case, while the I12 can be used as to the bit stream below slice_data( ), the stream needs to be changed as to the layers above the slice_header( ) to comply with moving image coding standards.

Specifically, the bit stream in layers above the slice_header( ) needs to be changed so that the picture becomes a non-IDR I picture, a bottom field picture (field_pic_flag=1 and bottom_field_flag=1), and frame_num=0.

To comply with moving image coding standards, while there are cases in which other parameters need to be changed other than the above, detailed descriptions of each of the specific cases are omitted herein.

Thus, ordinary coding processing is not needed to generate the I13' bit stream. It is only necessary to change part of the bit stream, and thus the I13' bit stream can be generated with a small calculation quantity.

In addition, as another example of a stream to be generated, cases in which a P-picture (referred to as PS13') having a zero residual signal is generated by referring to the I12 alone in inter-frame prediction and conducting motion compensation with a motion vector having a vertical length of 0.5 pixel will be briefly described.

In this case, a P-picture that is a bottom field picture and frame_num=0 is generated. Also, motion compensation is conducted on all the macroblocks vertically from +0.5 pixel location, and the residual signal is zero. In this way, an interpolation image is generated with a half pixel location interpolation filter standardized by H.264 from a decoded image of the I12, and a bit stream having the interpolation image as the bottom field can easily be generated.

In the first example in which the I13' is generated, an obtained decoded image shows that the pixel value of the bottom field corresponds to the repetition of the pixel value of the I12. However, in the second example in which the PS13' is generated, decoding results corresponding to the interpolation of the bottom field with the half pixel location interpolation filter can be obtained. The second example is superior to the first example in terms of image quality.

In the first exemplary embodiment of the present invention, an I-picture stream is extracted and analyzed. When the stream is coded by field coding with H.264 and cannot provide one screen of decoded image with the I picture alone, a bit stream which complements an image of the region in which a decoded image cannot be obtained is generated.

In the example of FIG. 3, since one screen of decoded image cannot be obtained with the extracted I picture I12 alone, a complementary P-picture stream P13' is generated. For example, by generating a stream based on a format complying with international standards of moving image coding such as H.264 and synthesizing the output I12 and P13' bit streams, a bit stream providing one screen of decoded image can be obtained. Thus, by decoding the bit stream with a decoding apparatus complying with standards, the same decoded image can be obtained.

Thus, it is possible to provide a moving image stream processing apparatus and method that can realize special reproduction such as high-speed reproduction and high-speed reverse reproduction, without changing a decoding apparatus.

Exemplary Embodiment 2

Figure 4:
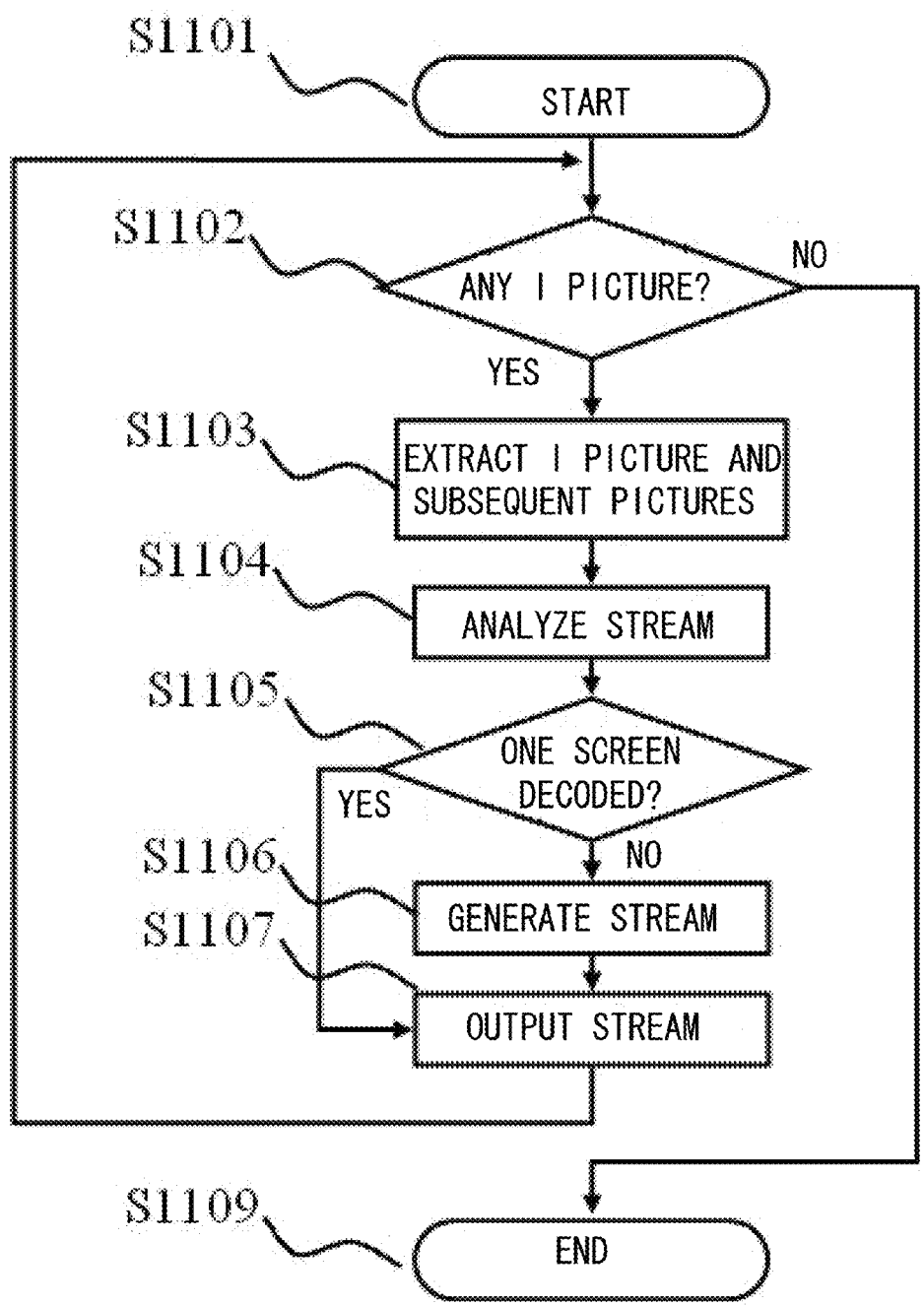
FIG. 4 shows a flow chart of a processing procedure of a second exemplary embodiment of the present invention.
Figure 5:
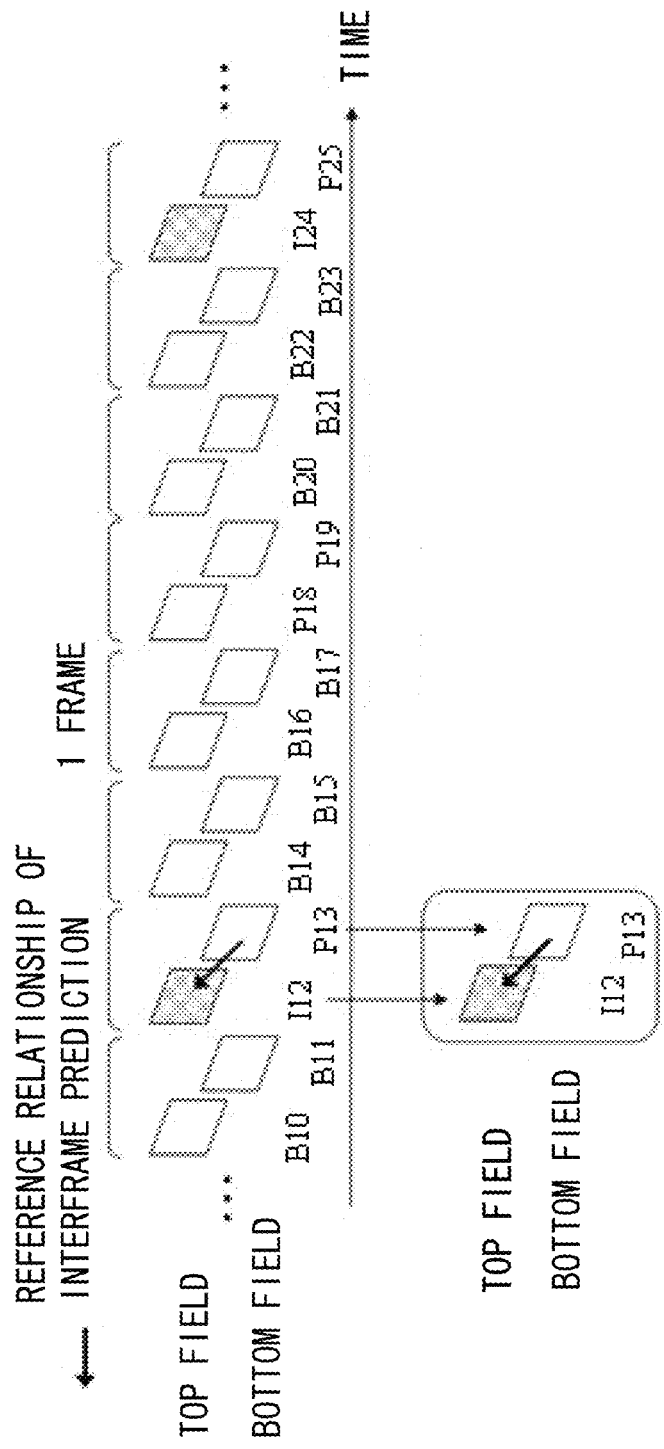
FIG. 5 shows an operation of the second exemplary embodiment of the present invention.

FIG. 4 shows a flow chart of an operation procedure of a second exemplary embodiment of the present invention. FIG. 5 schematically illustrates an operation of the second exemplary embodiment. The second exemplary embodiment of the present invention has the same configuration as the first exemplary embodiment shown in FIG. 1.

Further, in the flow chart of FIG. 4, steps S1101 to S1109 other than steps S1103 to S1105 are the same as those in steps S1001 to S1009 shown in the flow chart of FIG. 2.

In the second exemplary embodiment of the present invention, in step S1103, the stream extraction unit 201 extracts not only an I picture but also a prescribed number of picture streams subsequent to the I picture and supplies the extracted pictures to the stream analysis unit 202.

The stream analysis unit 202 analyzes a stream of an input I picture and subsequent pictures thereto and obtains information necessary for subsequent processing (step S1104). In addition to the information described in the first exemplary embodiment, examples of the information obtained by the stream analysis unit 202 include:
the frame number of each picture; and
the display order number.

Next, in step S1105, based on the obtained information, the stream of the I picture and subsequent pictures thereto is decoded, and whether or not one screen of decoded image including the I picture can be obtained is decided.

For example, when extracting an I picture and a single picture subsequent thereto based on H.264, if the I picture and the subsequent picture are a complementary field pair and either the I picture is an IDR picture or the subsequent picture is an I picture, it is decided that one screen of decoded image can be obtained.

In the second exemplary embodiment of the present invention, a stream of an I picture and a prescribed number of pictures subsequent thereto is extracted and analyzed. When one screen of decoded image including the I picture cannot be obtained with the extracted stream alone, a bit stream which complements an image of the region in which a decoded image cannot be obtained is generated.

FIG. 5 shows an example of the operation for extracting a stream of an I picture and a single picture subsequent thereto.

In the first exemplary embodiment, since one screen of decoded image cannot be obtained with the extracted I picture I12 alone, the complementary P-picture stream P13' is generated (see FIG. 3).

In the second exemplary embodiment of the present invention, in addition to the I picture I12, the subsequent P picture P13 is also extracted.

By decoding the I12 and the P13, one screen of decoded image including the I12 can be obtained. Thus, in the second exemplary embodiment of the present invention, the stream generation unit 204 does not generate a stream.

When decoding a stream of an I picture and a prescribed number of pictures subsequent thereto can provide one screen of decoded image including the I picture, a stream is not generated. Thus, an amount of calculation is reduced. Further, since an input bit stream of an image is used for special reproduction without change, image quality is not decreased.

Figure 6:
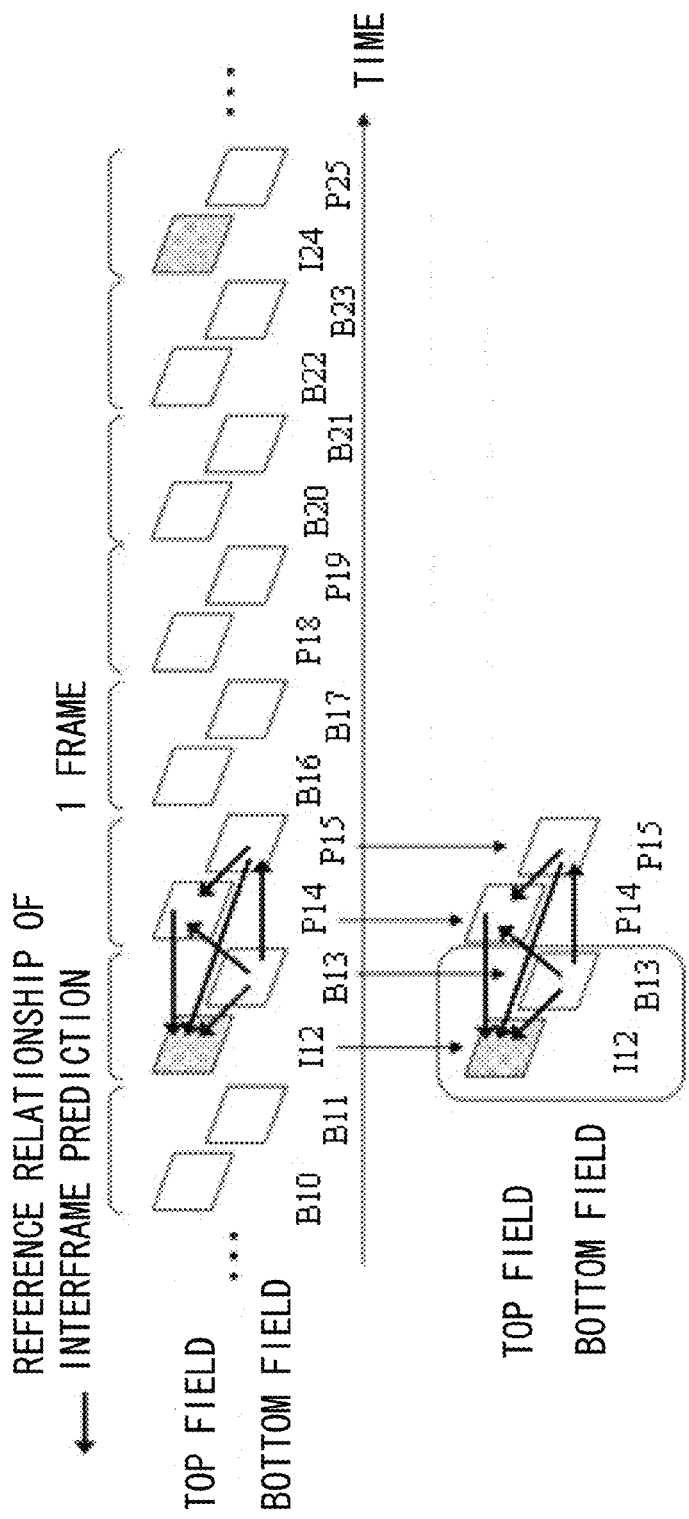
FIG. 6 shows another example of the operation of the second exemplary embodiment of the present invention.

FIG. 6 shows another example in which the picture structure of an input stream is different. In the example shown in FIG. 6, since one screen of decoded image including the I12 cannot be obtained by the operation of extracting a stream of an I picture and a single picture subsequent thereto described with FIG. 5, the stream generation unit 204 generates a field picture stream corresponding to the I12.

In the example of shown in FIG. 6, as another operational example, the stream extraction unit 201 extracts a stream of an I picture and three pictures subsequent thereto. In this operation, since one screen of decoded image including the I12 can be obtained by decoding the extracted stream, the stream generation unit 204 does not need to generate a stream.

However, even with the operation of extracting a stream of an I picture and three pictures subsequent thereto shown in FIG. 6, when an input bit stream having the picture structure as shown in FIG. 3 is received, the stream generation unit 204 needs to generate a stream.

Thus, the more pictures subsequent to an I picture that are extracted, the less necessary it is for the stream generation unit 204 to generate a stream. However, in order to obtain one screen of decoded image including the I picture, the amount of the stream that needs to be decoded is caused to be increased, which may result in an increase of the load on the decoding apparatus.

Thus, the appropriate number of pictures subsequent to an I picture that need to be extracted varies depending on operating conditions or required performance.

Exemplary Embodiment 3

Figure 7:
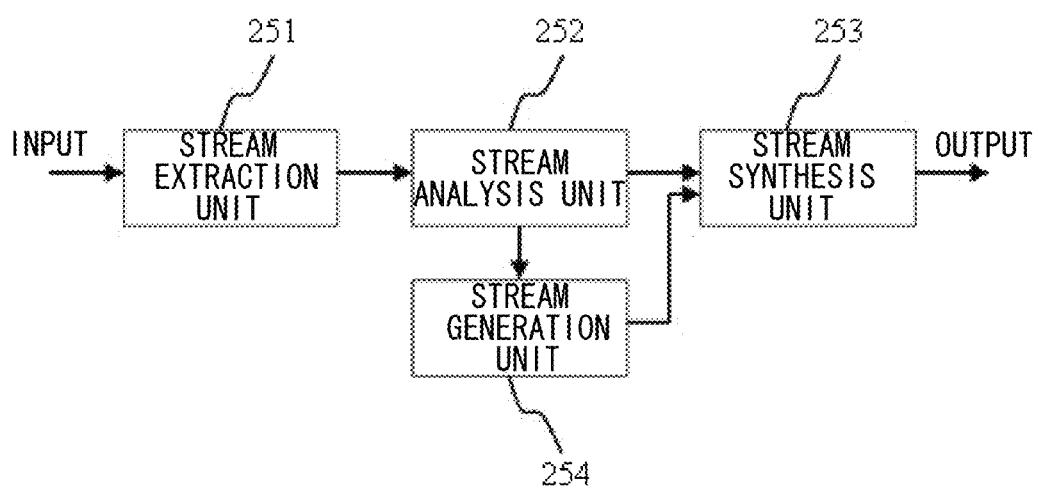
FIG. 7 shows a block diagram of a configuration of a third exemplary embodiment of the present invention.
Figure 8:
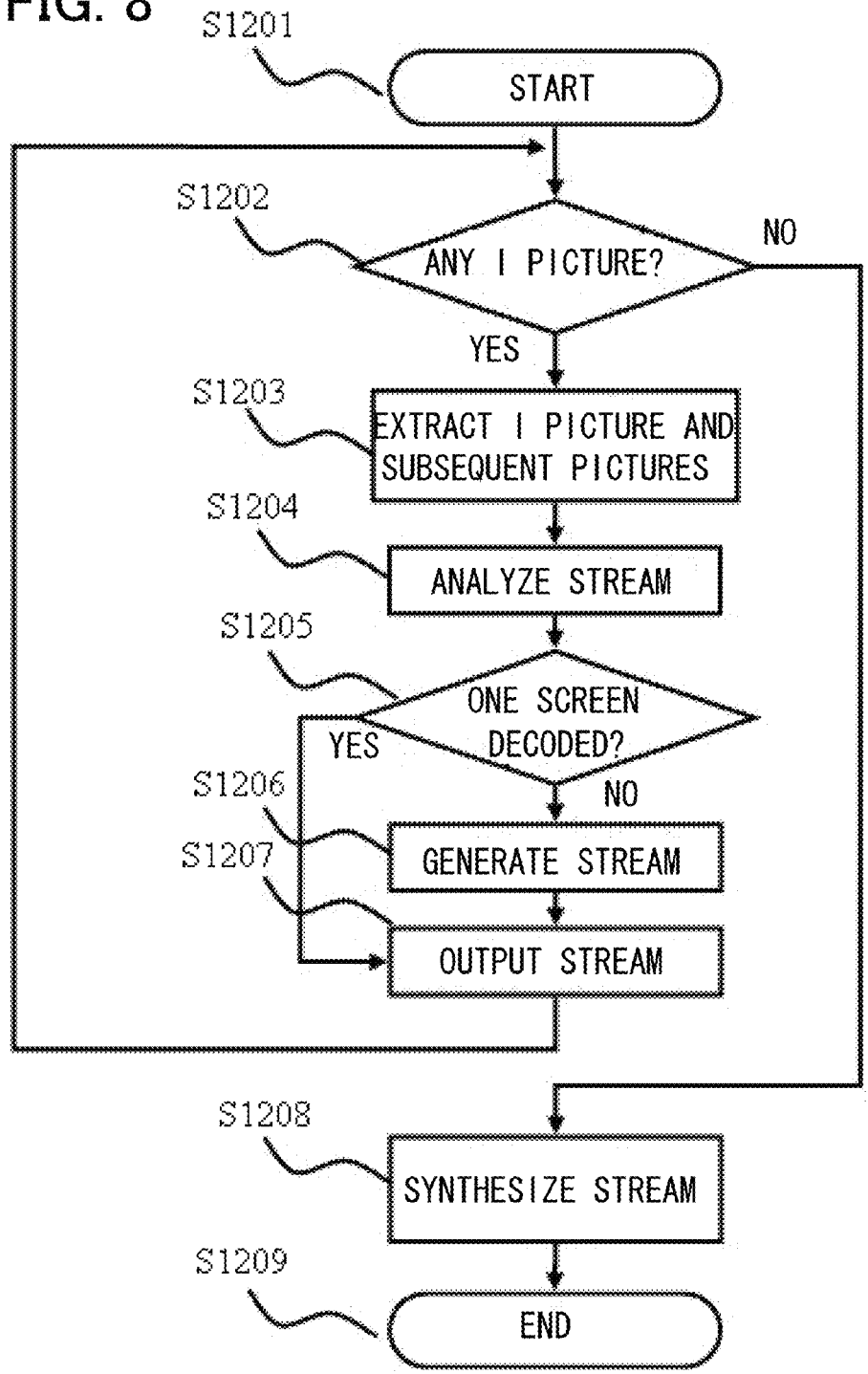
FIG. 8 shows a flow chart of a processing procedure of the third exemplary embodiment of the present invention.

FIG. 7 shows a block diagram of a configuration of a third exemplary embodiment of the present invention. FIG. 8 shows a flow chart of an operation procedure of the third exemplary embodiment of the present invention.

Referring to FIG. 7, a stream extraction unit 251, a stream analysis unit 252, and a stream generation unit 254 in the third exemplary embodiment of the present invention are the same as the units 201, 202, and 204, respectively, shown in FIG. 1 in the above first and second exemplary embodiments.

The third exemplary embodiment of the present invention further comprises a stream synthesis unit 253.

In the flow chart of FIG. 8, steps S1201 to S1209 other than steps S1207 and S1208 are the same as steps S1101 to S1109, respectively, in the flow chart of the above second exemplary embodiment described with reference to FIG. 4.

In the third exemplary embodiment of the present invention, in step S1207, a bit stream extracted by the stream extraction unit 251 and a bit stream generated by the stream generation unit 254 are supplied to the stream synthesis unit 253.

In step S1208, the bit streams supplied from the stream extraction unit 251 and the stream generation unit 254 are synthesized for each unit that can provide one screen of decoded image and delivered as a single bit stream. For example, in the example shown in FIG. 3, a bit stream of the I12 and the P13' arranged in this order is a unit from which one screen of decoded image can be obtained.

In the third exemplary embodiment of the present invention, since a bit stream extracted by the stream extraction unit 251 and a bit stream generated by the stream generation unit 254 are synthesized and delivered by the stream synthesis unit 253 for each unit from which one screen of decoded image can be obtained, it is possible to obtain one screen of decoded image by decoding the output bit stream independently for each of the units with a decoding apparatus.

Thus, by rearranging the output bit stream, based on each unit, special reproduction can easily be realized.

For example, by arranging and outputting the bit stream based on each unit in the display order, a high-speed reproduction bit stream can be obtained.

Further, by arranging and outputting the bit stream based on each unit in the reverse display order, a high-speed reverse reproduction bit stream can be obtained.

Furthermore, by arranging and outputting the bit stream in accordance with a certain playlist, reproduction based on the playlist can be easily realized.

Exemplary Embodiment 4

Figure 9:
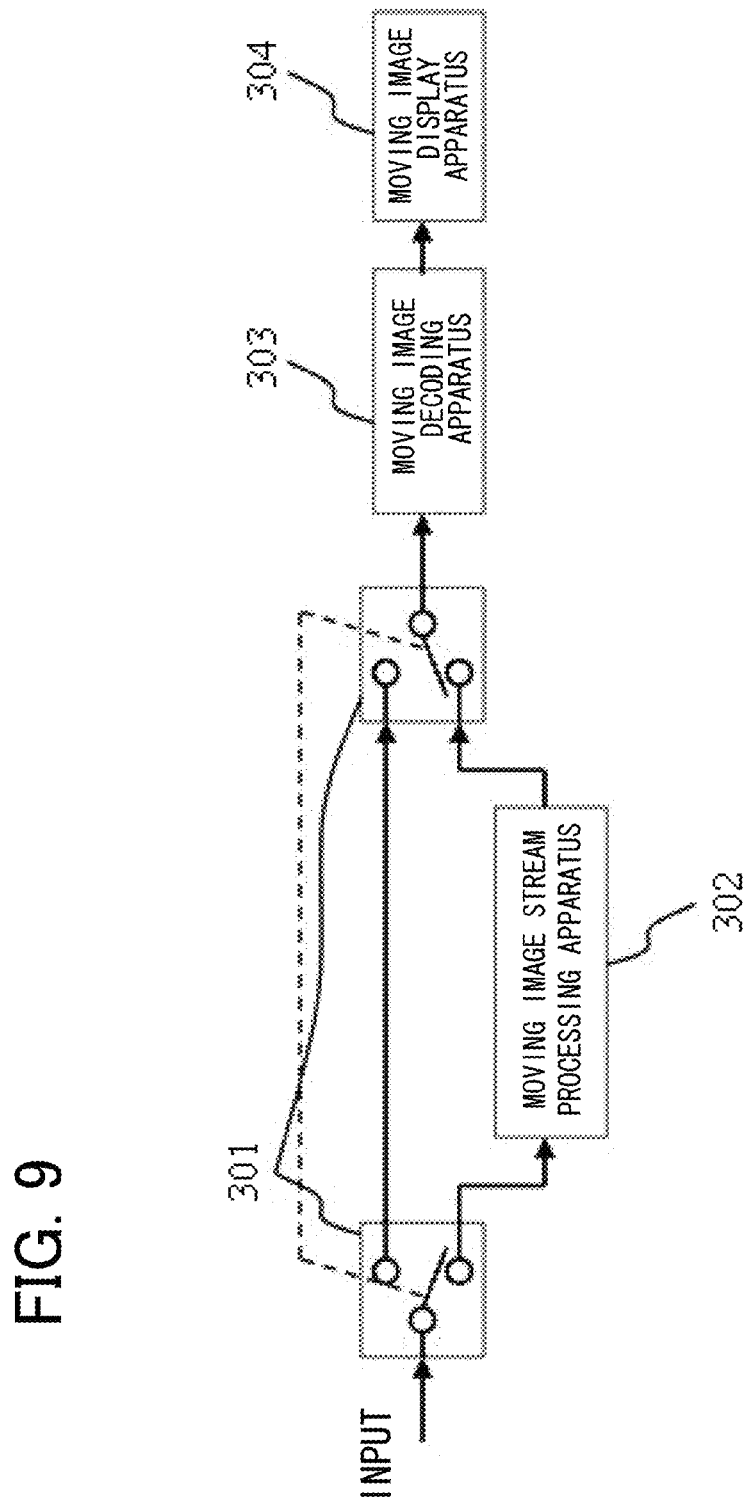
FIG. 9 shows a block diagram of a configuration of a fourth exemplary embodiment of the present invention.

FIG. 9 shows a structure of a fourth exemplary embodiment of the present invention. In FIG. 9, a moving image stream processing apparatus 302 comprises the moving image stream processing apparatus described in the above first or second exemplary embodiment.

For normal reproduction, a bit stream switching apparatus 301 directly supplies a bit stream received to a moving image decoding apparatus 303, and for special reproduction such as high-speed reproduction or high-speed reverse reproduction, the bit stream switching apparatus 301 supplies the bit stream received to the moving image stream processing apparatus 302. The bit stream output from the moving image stream processing apparatus 302 is supplied to the moving image decoding apparatus 303.

The moving image stream processing apparatus 302 processes a inputted bit stream received to generate a special-reproduction bit stream as described in the above first or second exemplary embodiment. The moving image stream processing apparatus 302 delivers a bit stream as a result of processing.

The moving image decoding apparatus 303 conducts decoding processing on the bit stream received and supplies a decoded image as a result to a moving image display apparatus 304.

The moving image display apparatus 304 outputs and displays the inputted image on a display unit such as a CRT or a liquid crystal display.

In the fourth exemplary embodiment of the present invention, for normal reproduction, an input bit stream is directly supplied to the moving image decoding apparatus 303. For special reproduction such as high-speed reproduction or high-speed reverse reproduction, the moving image stream processing apparatus 302 generates a stream for special reproduction such as high-speed reproduction or high-speed reverse reproduction and supplies the stream to the moving image decoding apparatus 303.

Based on the structure, it is possible to provide a moving image reproduction apparatus that realizes special reproduction such as high-speed reproduction and high-speed reverse reproduction, without adding any new functions or the like for special reproduction to a moving image decoding apparatus.

Exemplary Embodiment 5

Figure 10:
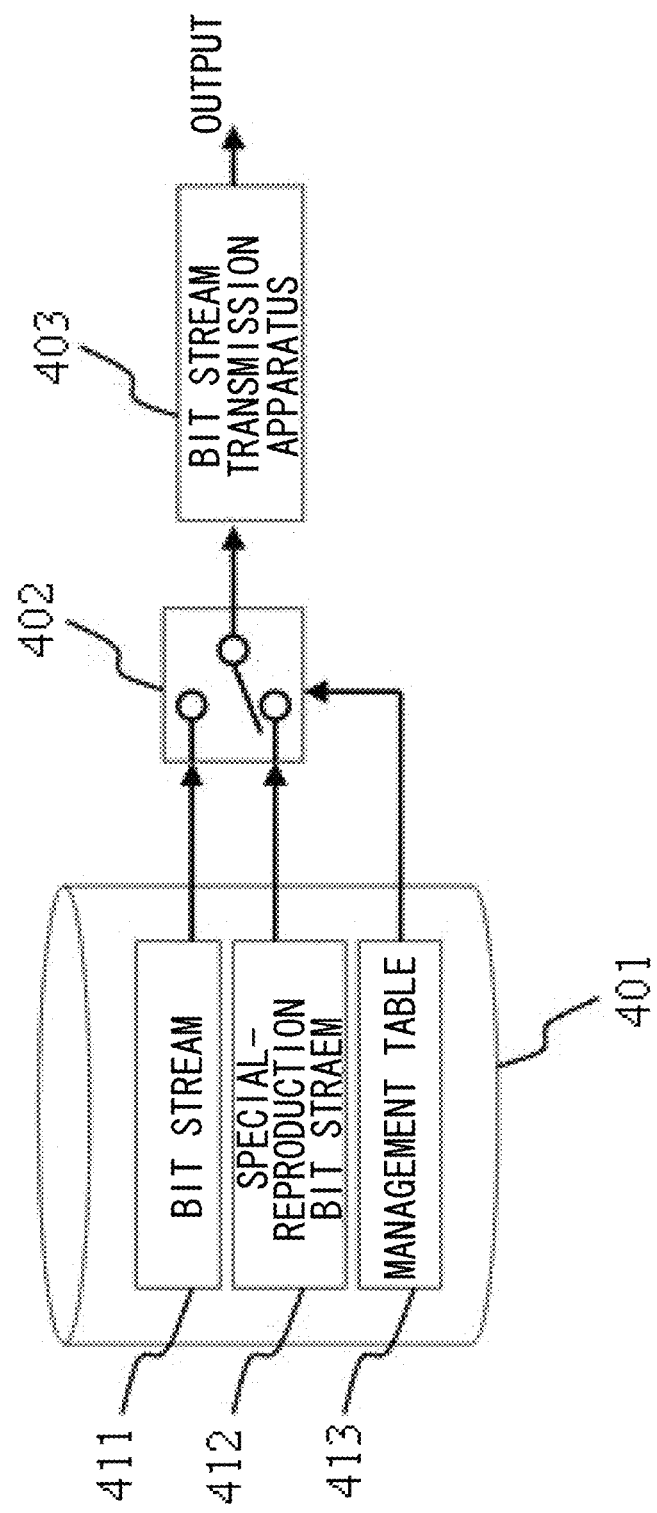
FIG. 10 shows a block diagram of a configuration of a fifth exemplary embodiment of the present invention.
Figure 13:
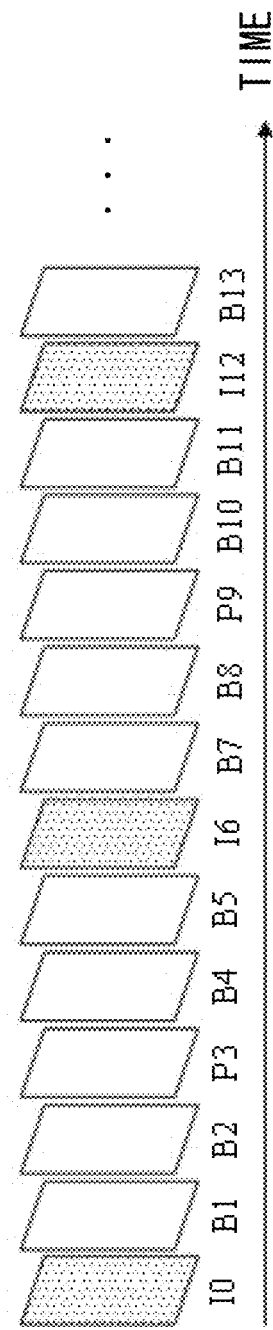
FIG. 13 shows an example of a configuration of moving-picture-coded pictures.
Figure 14:
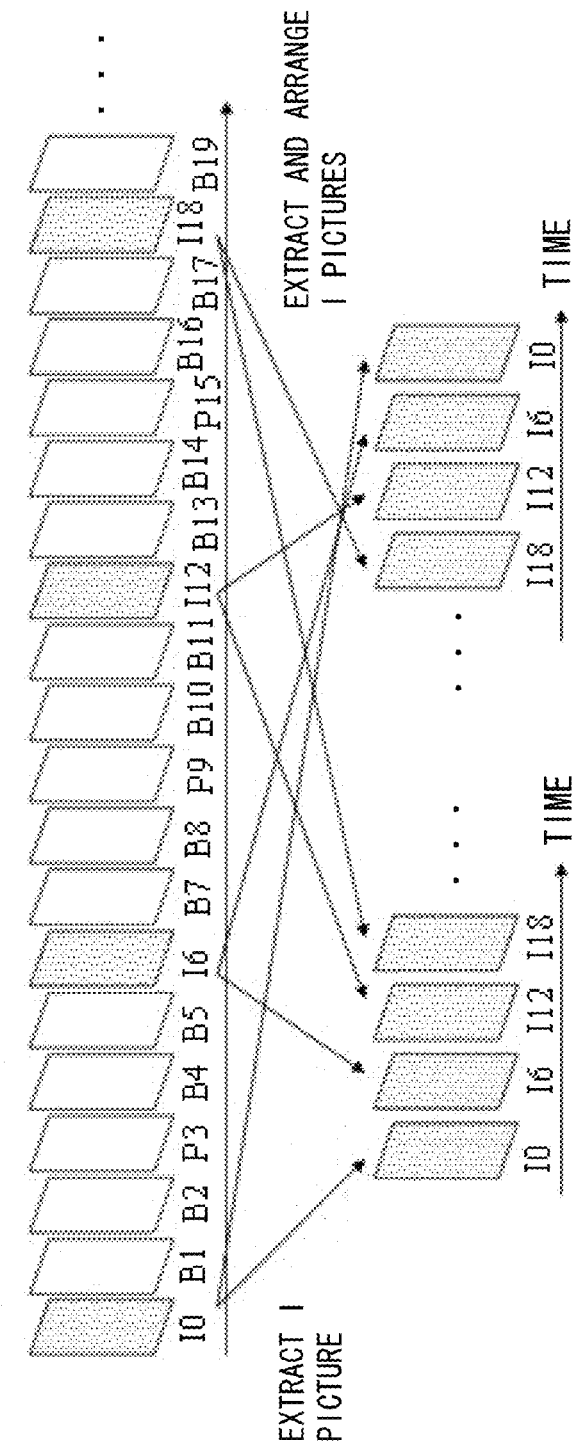
FIGS. 14A to 14C show an example of an operation of a related technique.

Next, a fifth exemplary embodiment of the present invention will be described. FIG. 10 shows a block diagram of a configuration of the fifth exemplary embodiment of the present invention. A recording medium 401 comprises: a bit stream of a coded moving image 411; a special-reproduction bit stream 412 for special reproduction such as high-speed reproduction and high-speed reverse reproduction generated by receiving the bit stream 411 to the moving image stream processing apparatus in the above first or the second exemplary embodiment; and a management table 413 in which information concerning association between the bit stream 411 and the special reproduction bit stream 412 is stored.

The management table 413 stores information that enables switching between the bit stream 411 and the special-reproduction bit stream 412.

FIG. 11 shows a simple example of the management table 413. In the example shown in FIG. 11, the management table 413 of FIG. 10 stores the bit stream 411 and the special-reproduction bit stream 412, each associated with a stored file name to enable switching of the streams.

The management table 413 of FIG. 10 may store information as shown in FIG. 12, for example. In the example shown in FIG. 12, in addition to storing the bit stream 411 and the special-reproduction bit stream 412 (a high-speed reproduction bit stream and a high-speed reverse reproduction bit stream) that are associated with stored file names, the management table 413 of FIG. 10 stores time stamps of the bit stream 411 corresponding to the individual pictures of the special-reproduction bit stream 412. With such information stored, when switching an operation from normal reproduction to special reproduction or from special reproduction to normal reproduction, a natural switching operation inheriting a reproduction-location time stamp is enabled.

Referring to FIG. 10, for normal reproduction, the bit stream switching apparatus 402 reads the bit stream 411 from the recording medium 401 and supplies the stream to a bit stream transmission apparatus 403. For special reproduction such as high-speed reproduction or high-speed reverse reproduction, the bit stream switching apparatus 402 refers to the management table 413, reads the special-reproduction bit stream 412 associated with the bit stream 411, and supplies the bit stream to the bit stream transmission apparatus 403.

The bit stream transmission apparatus 403 transmits a bit stream received to a transmission line such as a computer network for a certain receiving terminal.

In the fifth exemplary embodiment of the present invention, normal and special-reproduction bit streams are associated with each other and stored.

For normal reproduction, a normal bit stream is transmitted to a receiving terminal, and for special reproduction, a special-reproduction bit stream associated with the normal bit stream is transmitted to a receiving terminal.

Thus, it is possible to provide a moving image distribution apparatus that realizes special reproduction such as high-speed reproduction and high-speed reverse reproduction, without adding new functions or the like for special reproduction to a moving image decoding apparatus of the receiving terminal.

In each of the above exemplary embodiments, the description has been made based on examples in which the present invention is applied to the H.264 moving image coding method. However, the present invention is not merely limited to the above examples. The present invention is also applicable to other moving image coding methods including VC-1 standardized by SMPTE (Society of Motion Pictures and Television Engineers), where decoding results forming one screen may not be obtained with a conventional special-reproduction stream generation method involving extraction of I pictures.

Further, the decision of whether decoding an extracted stream can provide one screen of decoded image has been described based on the following: for example, whether an I picture is coded by field coding; and whether an I picture and a picture subsequent thereto are a complementary field pair.

However, needless to say, the determination method is not merely limited to the above. For example, decoding processing may be actually executed to decide whether the bit stream can be properly decoded.

Furthermore, the stream generation unit has been described with the examples including:

an example in which a stream is generated by making a copy of an I-picture bit stream and making changes necessary to comply with moving image coding standards; and an example in which a P-picture or B-picture bit stream is generated by referring to an I picture with inter-frame prediction and conducting a motion compensation with a motion vector having a vertical length of 0.5 pixel.

However, as a matter of course, the method for generating a stream is not merely limited to such examples.

For example, an interpolation filter or the like may be used to generate an image signal for a region in which a decoded image cannot be obtained, and the signal may be supplied to a coding apparatus, which compresses and codes moving images and outputs bit streams, so as to code the signal and generate a stream.

Further, while an intra-frame coded picture has been referred to and described as I picture, the present invention can also be applied to cases in which a special-reproduction stream is generated by using an I slice that often indicates a smaller image region.

Furthermore, needless to say, the present invention is applicable to a bit stream coded by using intra refresh based on each slice or macroblock.

Additionally, while high-speed reproduction and high-speed reverse reproduction are used as examples of special reproduction, the reproduction method is not limited to such examples. For example, the present invention is applicable to playlist reproduction, change of reproduction location to another bit stream, or the like. It should be noted as a matter of course that the expression "special reproduction" used in Claims includes various kinds of reproduction other than high-speed reproduction and high-speed reverse reproduction.

Also, a computer program realizing the processing/function of each of the stream extraction unit, the stream analysis unit, the stream generation unit, and the stream synthesis unit in each of the above exemplary embodiments may be loaded, for example, from a recording medium to a main memory, so that a computer (processor) can realize the computer program.

In the framework of entire disclosure of the present invention (including the claims), and based on its basic technological idea, exemplary embodiments or examples of the present invention may be changed and/or adjusted. Also it should be noted that in the framework of the claims of the present invention, any combinations or selections of various elements disclosed herein are possible. That is, needless to say, it is understood by those skilled in the art that various changes or modifications can be made to the present invention based on the disclosure of the present invention including the claims and the technological idea of the present invention.

What is claimed is:

1. A moving image stream processing apparatus comprising:

a stream analysis unit that performs analysis of an intra-frame coded picture and a prescribed number of pictures subsequent to the intra-coded picture extracted from a bit stream of a coded moving image and that decides whether or not decoding of the extracted intra-frame coded picture and the prescribed number of pictures subsequent to the intra-coded picture can provide one screen of decoded image including the intra-frame coded picture, the stream analysis unit deciding that one screen of decoded image including the intra-coded picture can be obtained only with the bit stream of the intra-coded picture and the prescribed number of pictures subsequent to the intra-coded picture extracted, if a condition that the intra coded picture and the subsequent picture are a complementary field pair, and either the intra coded picture is an IDR (Instantaneous decoding Refresh) picture or the subsequent picture is an intra coded picture, in H.264 is met, while the stream analysis unit deciding that the one screen of decoded image cannot be obtained from only the bit stream of the intra-coded picture and the prescribed number of pictures subsequent to the intra-coded picture, otherwise;

a stream generation unit that generates a bit stream of coded picture corresponding to an image of a region, in which a decoded image cannot be obtained, in one screen, based on the result of the analysis by the stream analysis unit, when it is decided in the stream analysis unit that the decoding of the extracted intra-frame coded picture and the prescribed number of pictures subsequent to the intra-coded picture cannot provide one screen of decoded image including the intra-frame coded picture; and a stream synthesis unit that receives the extracted bit stream of the intra-coded picture and the prescribed number of pictures subsequent to the intra-coded picture, or receives the extracted bit stream of the intra-coded picture and the prescribed number of pictures subsequent to the intra-coded picture and the bit stream generated by the stream generation unit and that synthesizes, from the received bit streams, an output bit stream of the coded pictures, from which one screen of decoded image can be obtained by a moving image decoding apparatus.

2. The moving image stream processing apparatus according to claim 1, further comprising
a stream extraction unit that extracts a bit stream of an intra-frame coded picture and the prescribed number of pictures subsequent to the intra-coded picture from the bit stream of a coded moving image and that supplies the extracted bit stream to the stream analysis unit.

3. The moving image stream processing apparatus according to claim 1, wherein the intra-frame coded picture is a field picture, and
the stream generation unit is arranged to generate a bit stream of a coded picture corresponding to the region in which a decoded image cannot be obtained in one screen, with an image identical or similar to the intra frame coded field picture, using information on the intra-frame coded picture.

4. The moving image stream processing apparatus according to claim 1, wherein the stream generation unit is arranged to change a prescribed portion of the bit stream of the intra frame coded picture to generate a bit stream of an intra-frame coded picture which complements an image of the region in which a decoded image cannot be obtained in the one screen.

5. The moving image stream processing apparatus according to claim 1, wherein the stream generation unit is arranged to refer to the intra-frame coded picture alone in inter-frame prediction to generate a bit stream of a unidirectionally predictive coded or bidirectionally predicative coded picture, which complements an image of the region in which a decoded image cannot be obtained, in the one screen.

6. The moving image stream processing apparatus according to claim 2, wherein when the stream analysis unit decides that one screen of decoded image including the intra-frame coded picture cannot be obtained only with the bit stream of the intra-frame coded picture and the prescribed number of pictures subsequent to the intra-frame coded picture extracted by the stream extraction unit, the stream generation unit generates a bit stream which complements an image of a region in which a decoded image cannot be obtained in one screen.

7. A moving image reproduction apparatus comprising:
a moving image decoding apparatus that decodes a bit stream of a coded moving image;
the moving image stream processing apparatus according to claim 1;
a bit stream switching apparatus; and
a moving image display apparatus,
wherein, for normal reproduction, the bit stream switching apparatus supplies a bit stream received directly to the moving image decoding apparatus not via the moving image stream processing apparatus, and for special reproduction, the bit stream switching apparatus supplies a bit stream received to the moving image stream processing apparatus,
the moving image stream processing apparatus supplying a generated bit stream to the moving image decoding apparatus,
the moving image decoding apparatus decoding the bit stream supplied and supplying the decoded image to the moving image display apparatus, and
the moving image display apparatus displaying and outputting the decoded image.

8. A moving image distribution apparatus comprising:
a storage device comprising a non-transitory recording medium that stores:
a bit stream of a coded moving image;
a special-reproduction bit stream obtained by inputting the bit stream of a coded moving image to the moving image stream processing apparatus according to claim 1, the special-reproduction bit stream being generated as an output from the moving image stream processing apparatus; and
a management table having associated information for conducting switching between the bit stream and the special-reproduction bit stream;
a bit stream switching apparatus; and
a bit stream transmission apparatus,
wherein, for normal reproduction, the bit stream switching apparatus reads the bit stream from the recording medium and supplies the bit stream to the bit stream transmission apparatus, and for special reproduction, the bit stream switching apparatus refers to the management table of the recording medium, reads the special-reproduction bit stream associated with the bit stream, supplies the read bit stream to the bit stream transmission apparatus, and
wherein the bit stream transmission apparatus transmits the supplied bit stream to a transmission line for a certain receiving terminal.

9. A moving image stream processing method, comprising:
analyzing a bit stream of an intra-coded picture and a prescribed number of pictures subsequent to the intra-coded picture extracted from a bit stream of a coded moving image and deciding whether or not decoding of the extracted intra-frame coded picture and the prescribed number of pictures subsequent to the intra-coded picture can provide one screen of decoded image including the intra-frame coded picture, decision that one screen of decoded image including the intra-coded picture can be obtained only with the bit stream of the intra-coded picture and the prescribed number of pictures subsequent to the intra-coded picture extracted being made, if a condition that the intra coded picture and the subsequent picture are a complementary field pair, and either the intra coded picture is an IDR (Instantaneous decoding Refresh) picture or the subsequent picture is an intra coded picture, in H.264 is met, while decision that the one screen of decoded image cannot be obtained from only the bit stream of the intra-coded picture and the prescribed number of pictures subsequent to the intra-coded picture being made, otherwise;
generating a bit stream of coded picture corresponding to an image of a region, in which a decoded image cannot be obtained, in one screen, based on the result of the analysis by the stream analysis unit, when the decision that the one screen of decoded image cannot be obtained from only the bit stream of the intra-coded picture and the prescribed number of pictures subsequent to the intra-coded picture is made; and
synthesizing, from the extracted bit stream and the prescribed number of pictures subsequent to the intra-coded picture, or from the extracted bit stream of the intra-coded picture and the prescribed number of pictures subsequent to the intra-coded picture and the generated bit stream, an output bit stream of the coded pictures, from which one screen of decoded image can be obtained by a moving image decoding apparatus.

10. The moving image stream processing method according to claim 9, wherein the intra-frame coded picture is a field picture, and the method comprises, in generating the bit stream, generating a bit stream which complements the region in which a decoded image cannot be obtained in the one screen, with an image identical or similar to the intra-frame coded field picture, using information on the intra-frame coded picture.

11. The moving image stream processing method according to claim 9, wherein the method comprises, in generating the bit stream, changing a prescribed portion of the bit stream of the intra-frame coded picture to generate a bit stream of an intra-frame coded picture which complements the image of the region in which a decoded image cannot be obtained, in the one screen.

12. A moving image reproduction method, comprising:
switching bit streams so that, for normal reproduction, a bit stream received is directly supplied to a moving image decoding apparatus and, for special reproduction, a bit stream received is supplied to the moving image stream processing method according to claim 9 and the processed bit stream is supplied to the moving image decoding apparatus; and
allowing the moving image decoding apparatus to decode the supplied bit stream and allowing a moving image display apparatus to display and output the decoded image.

13. A storage device storing a program causing a computer to execute video layer processing comprising:
a stream analysis processing that receives and analyzes a bit stream of an intra-frame coded picture and a prescribed number of pictures subsequent to the intra-coded picture extracted from a bit stream of a coded moving image and that decides whether or not decoding of the extracted intra-frame coded picture and the prescribed number of pictures subsequent to the intra-coded picture can provide one screen of decoded image including the intra-frame coded picture, the stream analysis processing deciding that one screen of decoded image including the intra-coded picture can be obtained only with the bit stream of the intra-coded picture and the prescribed number of pictures subsequent to the intra-coded picture extracted, if a condition that the intra coded picture and the subsequent picture are a complementary field pair, and either the intra coded picture is an IDR (Instantaneous decoding Refresh) picture or the subsequent picture is an intra coded picture, in H.264 is met, while the stream analysis processing deciding that the one screen of decoded image cannot be obtained from only the bit stream of the intra-coded picture and the prescribed number of pictures subsequent to the intra-coded picture, otherwise;
a stream generation processing that generates a bit stream of coded picture corresponding to an image of a region, in which a decoded image cannot be obtained, in one screen, based on the result of the analysis by the stream analysis processing, when the stream analysis processing decides that the decoding of the extracted intra-frame coded picture and the prescribed number of pictures subsequent to the intra-coded picture cannot provide one screen of decoded image including the intra-frame coded picture; and
a stream synthesizing processing that synthesizes, from the extracted bit stream and the prescribed number of pictures subsequent to the intra-coded picture, or from the extracted bit stream of the intra-coded picture and the prescribed number of pictures subsequent to the intra-coded picture and the generated bit stream, an output bit stream of the coded pictures, from which one screen of decoded image can be obtained by a moving image decoding apparatus.

14. The storage device according to claim 13, wherein the intra-frame coded picture is a field picture, and
the stream generation processing generates a bit stream which complements the region in which a decoded image cannot be obtained in the one screen, with an image identical or similar to the intra-frame coded field picture, using information on the intra-frame coded picture.

15. The storage device according to claim 13, wherein the stream generation processing changes a prescribed portion of the intra frame coded picture bit stream to generate a bit stream of an intra-frame coded picture which complements an image of the region in which a decoded image cannot be obtained in the one screen.

* * * * *